United States Patent [19]

Faber

[11] 3,821,837
[45] July 2, 1974

[54] CUTTING INSERT AND CUTTING TOOL
[75] Inventor: Kurt Heinrich Albert Erich Faber, Sandviken, Sweden
[73] Assignee: Sandvik Aktiebolag, Sandviken, Sweden
[22] Filed: July 5, 1973
[21] Appl. No.: 376,296

[30] Foreign Application Priority Data
July 7, 1972 Switzerland.....................9084/72

[52] U.S. Cl.......................... 29/95, 29/96, 29/105 A
[51] Int. Cl............................. B26d 1/00, B26d 1/12
[58] Field of Search............. 29/95, 96, 105, 105 A

[56] References Cited
UNITED STATES PATENTS
2,595,090    4/1952    Middleton............................... 29/96
2,641,049    6/1953    Kennicott............................... 29/96

FOREIGN PATENTS OR APPLICATIONS
1,246,360    8/1967    Germany............................... 29/96
499,697      6/1930    Germany............................... 29/96
504,221      12/1954   Italy........................................ 29/96
979,664      1/1965    Great Britain......................... 29/96
1,166,591    3/1964    Germany............................ 29/105 A
1,502,096    8/1969    Germany............................ 29/105 A Primary Examiner—Harrison L. Hinson
Attorney, Agent, or Firm—Pierce, Scheffler & Parker

[57] ABSTRACT

In a chip-forming cutting tool, the novel insert is provided, at one base surface (at a distance from the cutting corner at each primary bevel face) with a recess for receiving a clamping element. Each pair of bevel faces are separated from each other by a second pair of bevel faces each of which intersects with an associated side surface at an edge of less than 90°. This edge defines a back cutting edge.

9 Claims, 6 Drawing Figures

CUTTING INSERT AND CUTTING TOOL

This invention relates to a cutting insert and to a cutting tool for chip-cutting operations comprising a cutter body provided with at least one recess for receiving such an insert which is in the form of a prismatic bar having mutually parallel side surfaces and base surfaces at both of its ends, the cross-section of which bar is in the shape of a parallelogram and the side surfaces of which intersect to define longitudinally extending main cutting edges, a pair of primary bevel surfaces being arranged at a base surface thereof.

It has been conventional to secure a cutting insert in a site by means of a pin projecting into a hole which passes centrally through the insert, or (more recently) by means of clamping elements acting against the chip face and the opposed side surface of the insert, or a combination of both these clamping methods. To date the development has lead from using the last-mentioned concept to the use of the first-mentioned (i.e., to pin-holders). This course of development has been caused by the fact that clamping elements acting against the chip side of the insert have prevented or obstructed chip removal. The common disadvantage of these two methods is, however, that the inserts to be adapted therefor require relatively high amounts of cutting material calculated in terms of edge length.

An object of the present invention is, therefore, to obviate — partially or wholly — the above mentioned disadvantages and simultaneously to facilitate indexing of inserts on cutting tools. The invention realizes those advantages inherent with inserts with central holes, viz, the free (i.e. no-chip-preventing) top side of the insert while to a remarkable degree giving the advantage of lessening the amount of cutting material used as calculated in terms of edge length. This is now possible (1) due to the fact that the insert is of such shape that use of any clamping element acting against the chip face of the insert now is unnecessary and (2) due also to the fact that the extension of said chip face (as seen from the cutting edge) now can be lessened to a remarkable degree.

To this end there is provided, according to an aspect of the invention, a cutting insert of the aforementioned type which is characterized in that the insert is provided, at one base surface at a distance from the cutting corner at each primary bevel face, with a recess for the reception of a clamping element, and in that said pair of primary bevel faces are separated from each other by a second pair of bevel faces each of which intersects with an associated side surface at an edge of less than 90°, said last edge defining a back cutting edge.

The invention will now be described in greater detail in the following description and by way of an illustrative example, taken with reference to the accompanying drawing wherein.

Figure 1:
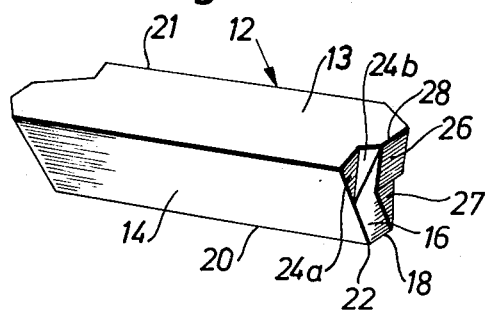
FIG. 1 is an elevational view of one embodiment of the cutting insert of the invention.
Figure 2:
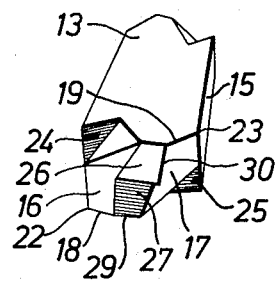
FIG. 2 is another elevational view of the insert shown in FIG. 1.

Referring now to the drawings, and more particularly to FIGS. 1–2 thereof which represent an example of a cutting insert of the invention, the insert consists of a prismatic bar designated generally by numeral 12, having a cross-section in the shape of a parallelogram. The preferred embodiment as shown in the figures is of perpendicularly parallelepipedic shape comprising mutually parallel side surfaces defining chip faces of which only one, 13, is visible in FIGS. 1–2, and mutually parallel side surfaces 14 and 15 forming parallel longitudinal edges therewith and defining clearance faces. This insert embodiment is a so-called negative cutting insert, i.e. an insert of square or rectangular cross-section wherein all the junctions between the respective longitudinally extending side surfaces define main cutting edges.

The insert of FIGS. 1–2 is provided at each base surface thereof with a pair of primary bevel faces 16 and 17, the planes through which faces each intersects with a chip face and an adjacent clearance face at an angle of more than 90° and with the opposed chip face at an edge of less than 90°. In FIGS. 1–2 a plane extending through bevel face 16 thus intersects with surfaces 13 and 14 at angles of more than 90° while intersecting with the opposed chip surface (not visible) at an edge 18 of less than 90°, and likewise a plane extending through bevel face 17 intersects with the chip surface 13 at an edge 19 of less than 90°. The said last edges 18 and 19 meet with associated main cutting edges 20 and 21 at cutting tips 22 and 23. The edges 18 and 19 define secondary or "finish" cutting edges intended to cooperate with said associated main cutting edges 20 and 21.

The negative cutting insert of FIGS. 1–2 thus comprises four main cutting edges and four finish cutting edges associated therewith.

This insert is provided, at each base surface, at a distance from said cutting tips 22 and 23, with recesses 24 and 25 each of which is adapted to receive a clamping element so as to enable safe fixation of the insert in an insert-receiving site in a cutter body. In the preferred embodiment thus shown, the recesses are situated at the diagonally opposed inactive corners of each base surface, and each has the form of a V-shaped recess defined by two triangular surfaces. It is to be understood however, that the recess may have other suitable shape, — spherical, for instance.

At each base surface of the insert each said pair of primary bevel faces is separated by a pair of secondary bevel faces, each of which latter intersects with an associated chip face at an edge of less than 90°. In the embodiment shown the bevel faces 16 and 17 are thus separated by two bevel faces 26 and 27, each of which intersects with an associated chip face at an edge, 28 and 29 respectively. of less than 90°. The said edges 28 and 29 are intended to act as so-called "back-cutting" edges. Due to such an arrangement all those parts of the insert which could be brought into engagement with a workpiece will exhibit a clearance angle which implies that a rotating cutter body equipped with such inserts will be free-cutting at all circumstances.

Each of said secondary bevel faces should preferably meet with an adjacent primary bevel face at an edge of more than 120°. In FIG. 2 the bevel face 26 thus meets with bevel face 17 at an edge 30 of more than 120°.

In another insert embodiment in accordance with the present invention, a so-called "positive" cutting insert having rhombic or rhomboidal cross-section, only two diagonally opposed longitudinal edges define main cutting edges. The said one base surface or end portion of the insert thus also comprises two "finish" cutting edges associated with said main cutting edges. It should be noted that in the case of a positive cutting insert all the bevel faces provided at both bar ends do not necessarily have to exhibit exactly the same obliqueness, which is the case with a negative cutting insert. It is essential, however, that those primary bevel faces forming one pair at each bar end mutually have the same obliqueness, and that the obliqueness of the primary bevel faces at the opposed bar end intended to alternately abut against a support surface sloping inwardly against the insert-receiving site is at least substantially the same as that of said supporting surface. In the clamping of such a positive cutting insert in its site it is possible to arrive at a more positive chip angle than is attainable with a negative cutting insert.

Figure 3:
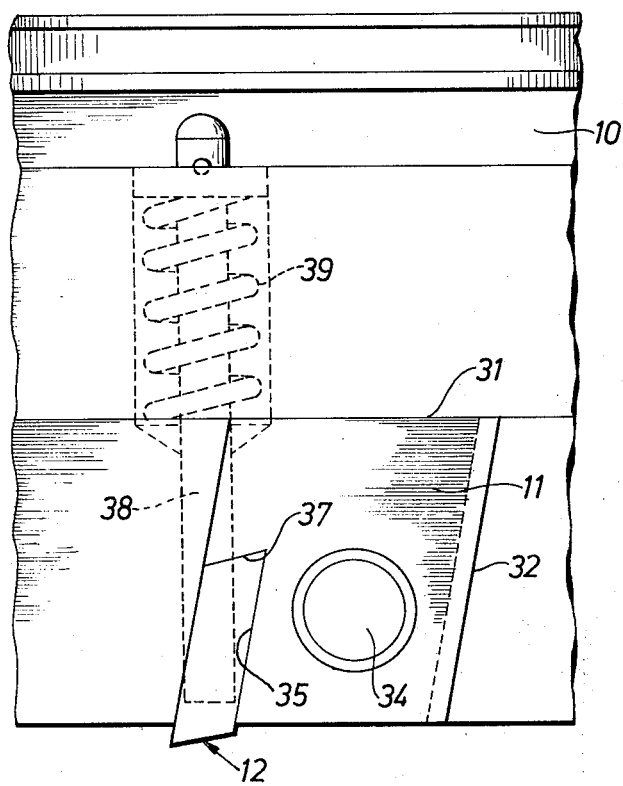
FIG. 3 is a partial side view of a milling cutter equipped with the cutting insert shown in FIGS. 1–2.
Figure 4:
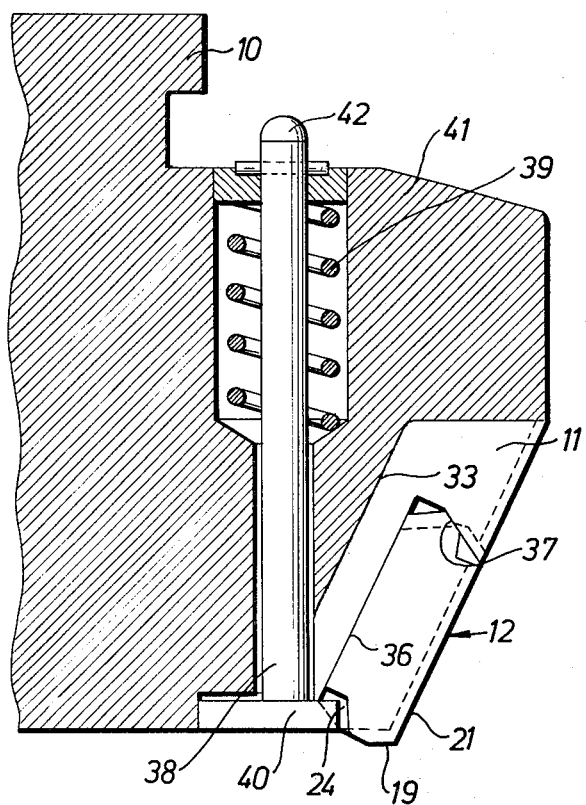
FIG. 4 is an axial sectional view of the milling cutter shown in FIG. 3.

Referring now to FIGS. 3–4 a cutting tool, — namely a milling cutter, is formed so as to be equipped with cutting inserts such as hereinbefore described. In the drawing a cutter body 10 of a milling cutter has recesses spaced around the circumference thereof, in which recesses shim plates 11 are arranged, each of which shim plates exhibits an insert-receiving site for the reception of a cutting insert 12 of the afore-mentioned type. The plates 11 may be provided with plain supporting surfaces 31, 32, 33 as shown in FIGS. 3–4, so as to abut against complementary support surfaces in the cutter body. Each plate 11 is, suitably in the manner illustrated, secured to the cutter body 10 by means of a screw 34 received in a hole which passes centrally through the plate. Each of the insert-receiving sites provided in said plates comprises a bottom surface 35 and side support surfaces 36 and 37 complementary in shape to that of the insert and extending towards the tip not located in a position to perform cutting work.

The clamping means adapted to safely secure each insert in its site comprises a pull rod 38 arranged to be actuated by a spring 39, the end portion of said rod being formed as a hook or the like 40 adapted to engage with a recess 24 therefor located in the end portion of aid prismatic insert 12. The pull rod 38 thereby is arranged to urge the insert upwards into its site having one primary bevel face thereon in abutting relationship with a corresponding support surface 37 which is inclined inwardly into the site at an angle of less than 90° with respect to said bottom support surface 35. Due to this arrangement, the surface 37 is brought by wedge action into engagement with a bevel surface of said insert thus urging the insert safely into its site.

Figure 5:
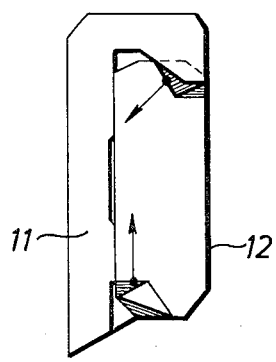
FIG. 5 is a side view of an insert-receiving plate disclosing the directions of clamping forces acting upon an insert arranged therein.
Figure 6:
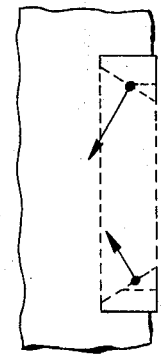
FIG. 6 is a view illustrating the same clamping forces but seen from a direction 90° removed from what is shown in FIG. 5.

FIG. 5 is a side view illustrating how said clamping principle results in two clamping forces acting on the insert in two substantially opposite directions. FIG. 6 illustrates the same clamping forces from a direction 90° removed from what is shown in FIG. 5. In FIG. 6 the edge 21 defines the main cutting edge while the edge 19 defines the secondary or "finish" cutting edge.

The spring-actuated pull rod 38 is preferably arranged to move substantially parallel with the axis of rotation of the milling cutter, as shown in FIGS. 3–4.

The pull rod 38 ought to be so arranged in the cutter body that it is easily actuated from outside in order to loosen, and clamp, the insert. This should suitably be done by placing the rod 38 uncovered at the back 41 of the cutter body so that at the push of the end portion 42 of said rod the insert will be relieved from its site in the plate 11. It should be noted that the surface (or, partial surface) of said recess 24, comprising two surface portions 24a and 24b, intended for engagement with said hook 40 ought to intersect with the associated clearance face at an edge of about, or preferably less than, 90°. This is a necessary condition for safely securing the insert against action from the cutting forces acting thereon during cutting work. The recess surface 24a thus intersects with side surface 14 at an edge of less than 90° as in FIGS. 1–2.

I claim:

1. An insert adapted to be supported on a bottom surface in an insert-receiving site in a cutter body, while being located against side supports in said site, said insert comprising a prismatic bar of cutting material having mutually parallel side surfaces and base surfaces at both of its ends, the cross-section of which bar is in the shape of a parallelogram and the side surfaces intersect to define longitudinally extending main cutting edges, at least one of said base surfaces having a pair of primary bevel faces extending in planes each of which intersects with planes through two of said side surfaces at angles of more than 90° and with another side surface at an angle of less than 90°, said last junction defining an edge which meets with an associated main cutting edge into a cutting tip while defining a finish cutting edge to cooperate with said main cutting edge, each of said primary bevel faces being provided with a recess at a distance from said cutting tip to receive a clamping element, said pair of primary bevel faces being separated from each other by a pair of secondary bevel faces each of which latter intersects with an associated side surface at an edge of less than 90°, said last edge defining a back cutting edge.

2. A cutting insert as defined in claim 1, in which the insert is of perpendicularly parallelepipedic shape having a rectangular or square cross section, the side surfaces whereof intersect to define four main cutting edges and each base surface at the bar end having a pair of primary bevel faces each intersecting with a side surface to define a finish cutting edge for cooperation with an associated main cutting edge, said pair of primary bevel faces being separated by a pair of secondary bevel faces each intersecting with a side surface to define a back cutting edge.

3. A cutting insert as defined in claim 1 in which each of said secondary bevel faces intersects with an adjacent primary bevel face at an edge of more than 120 degrees.

4. A cutting insert as defined in claim 1 in which said recesses adapted for the reception of clamping elements are provided in diagonally opposed inactive corners at the base surface.

5. A cutting insert as defined in claim 4 in which the recesses are V-formed each comprising two triangular surfaces.

6. A cutting insert as defined in claim 4 in which that surface of said recess intended for engagement with a clamping element intersects with an associated side surface at an edge of about 90°.

7. A cutting insert as defined in claim 4 in which that surface of said recess intended for engagement with a clamping element intersects with an associated side surface at an edge of less than 90°.

8. A cutter comprising a body having at least one pocket defining an insert site, an insert in the form of a prismatic bar as defined in claim 1 resting in said site against complementary support surfaces therein comprising a bottom support surface and side supports upstanding therefrom, in said cutter body a spring device comprising a spring-loaded pull rod provided at the end thereof with a hook is disposed to engage with said recess formed in one bar end so as to urge the insert into said pocket with a diagonally opposed bevel surface at the opposed bar end in abutting relationship with a correspondingly inclined support surface in said site, thus enabling clamping the insert into its site under the action of two clamping forces acting in substantially opposed directions.

9. A cutter as defined in claim 8 comprising
a cutter body having a plurality of recesses spaced about the circumference of said cutter body, each recess defining an insert-receiving site, each said recess having a bottom support surface and side support surfaces upstanding therefrom;
a plurality of cutting inserts each as defined in claim 1 positioned in said recess in contact with said complementary support surfaces,
in said cutter body a spring-loaded pull rod arranged to move substantially parallel with the axis of rotation of said cutter body so that at a spring actuation of the rod the hook provided thereon engages with said recess provided in said base surface thus urging the insert with a bevel face at the opposed base surface to engage with a corresponding inwardly inclined support surface in said site, said inclined support surface being inclined at an angle of less than 90° with respect to said bottom support surface in said insert-receiving site.

* * * * *